United States Patent
Yang

(10) Patent No.: US 6,733,329 B2
(45) Date of Patent: May 11, 2004

(54) USB FLASH DRIVE

(76) Inventor: Fu-I Yang, 5th Floor, Hsin Pu 8th Street, Taoyuan City (TW)

( * ) Notice: Subject to any disclaimer, the term of this patent is extended or adjusted under 35 U.S.C. 154(b) by 0 days.

(21) Appl. No.: 10/223,989

(22) Filed: Aug. 21, 2002

(65) Prior Publication Data

US 2004/0038592 A1 Feb. 26, 2004

(51) Int. Cl.[7] ................................................ H01K 29/00
(52) U.S. Cl. ...................................... 439/518; 439/638
(58) Field of Search ................................. 439/638, 518

(56) References Cited

U.S. PATENT DOCUMENTS 6,394,813 B1 * 5/2002 Stout et al. .................... 439/11

* cited by examiner

*Primary Examiner*—Ross Goshi

(74) *Attorney, Agent, or Firm*—Rosenberg, Klein & Lee

(57) ABSTRACT

The present invention relates to a USB flash drive includes a mobile storage device and at least one interconnector. The mobile storage device is provided with a built-in circuit board having a connector at one end thereof. The connector is in connection with a controller and a flash memory to create an electrical connection. Moreover, the connection interface of the connector juts outside the housing. The interconnector includes a socket at one end thereof which corresponds to the connector of the mobile storage device. The outer end of the interconnector is constructed as a USB interface fastened into the inside of the housing. Besides, the outer end of USB interface juts outside the housing.

1 Claim, 5 Drawing Sheets

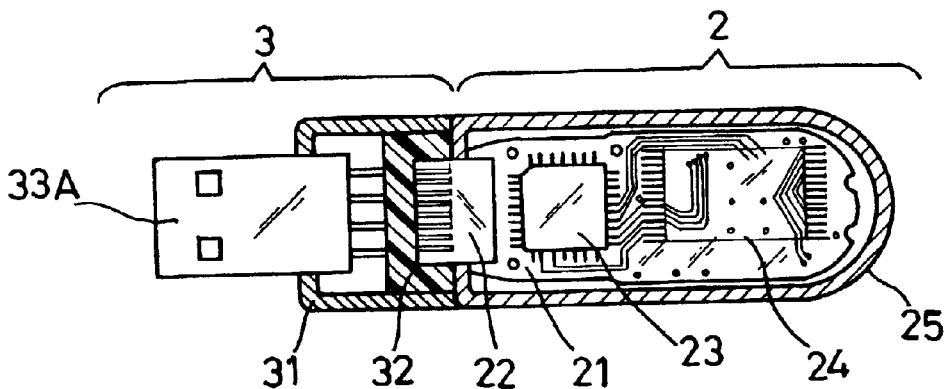
F I G. 4
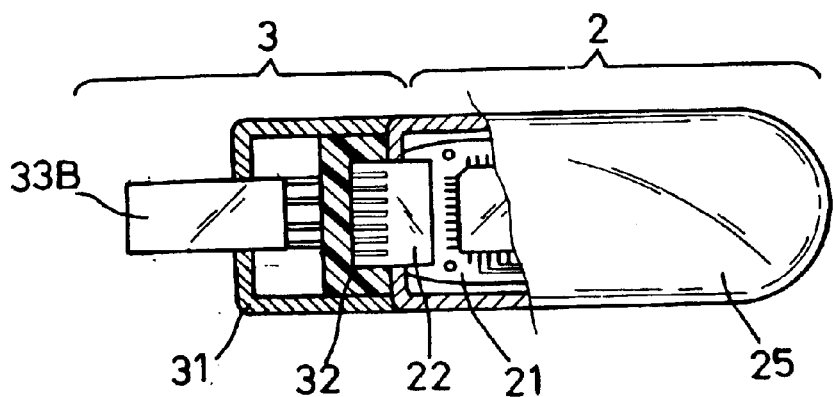
F I G. 5
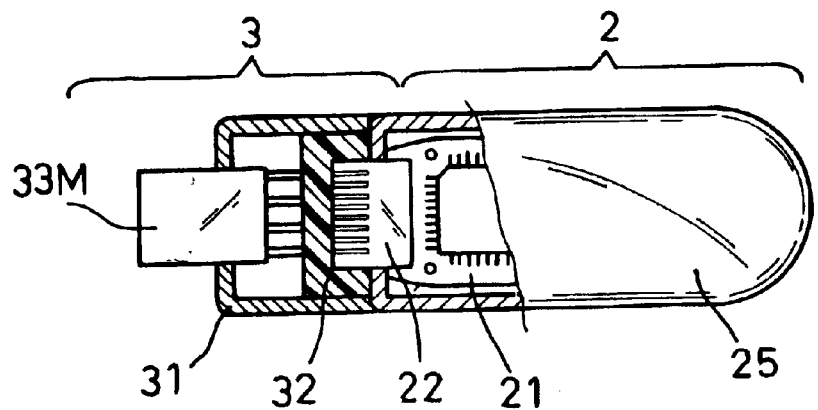
F I G. 6

USB FLASH DRIVE

BACKGROUND OF THE INVENTION

1. Field of the Invention

The present invention relates to a USB flash drive, and more particularly, to a pen drive with additional interconnectors for connecting to USB interfaces of different specifications.

2. Description of the Prior Art

The early stage personal computer has a large volume and is not suitable for the businessmen to carry outside. With the development of high technology, it's much easy and convenient for notebook computer to carry outside. However, it's also a great burden to carry a notebook computer when going abroad for a business trip. With further development of high technology, a mobile storage device composed of a controller and a flash memory appears in the market. FIG. 1 illustrates a conventional pen drive 1 which is similar to a thumb in shape and size. This conventional pen drive 1 with built-in controller and flash memory currently has max. 1 gigabyte storage capacity. More and more people use it to store data. It'simpler to carry it than the notebook computer so that its market is rapidly boosted.

In order to connect with computers everywhere, the pen drive 1 is provided with a plug-in type connector 11 for connecting to the USB (Universal Series Bus) port of the common personal computer. The previous USB port has only one specification so that there is no problem with the connection. With never-ending changes and improvements of digital technology, digital printer, digital camera, digital videocamera, etc. have been developed one after another. These digital products have very small volume so that their USB specification does not always correspond to that of personal computers. The pen drive 1, as shown in FIG. 1, fits personal computer. However, it can't be connected to digital camera for transferring photo data from digital camera to personal computer. In order to save the photo image to personal computer, it's required to remove the memory card of the digital camera and then to place it into a card reader for data transfer. It causes, however, much inconvenience.

At present, USB specification includes three commercially available types (A-type, B-type and Mini-type) which are applicable to different data devices (personal computer, printer, digital camera, etc.). Therefore, the mobile storage device must have corresponding USB connector to be in connection with different data devices. Moreover, the current mobile storage device can be used for one kind of data device so that its application scope is restricted.

SUMMARY OF THE INVENTION

It is a primary object of the present invention to provide a USB flash drive which is a multifunctional device to enlarge the application scope of the mobile storage device.

It is another object of the present invention to provide a USB flash drive which utilizes a detachable interconnector to reach a smooth data transfer between USB interfaces of different specifications.

BRIEF DESCRIPTION OF THE DRAWINGS

The accomplishment of this and other objects of the invention will become apparent from the following description and its accompanying drawings of which:

FIG. 4 is a sectional view of the embodiment of the present invention (A-type USB);

FIG. 5 is a sectional view of the embodiment of the present invention (B-type USB);

FIG. 6 is a sectional view of the embodiment of the present invention (Mini-type USB);

DETAILED DESCRIPTION OF THE PREFERRED EMBODIMENT

Figure 1:
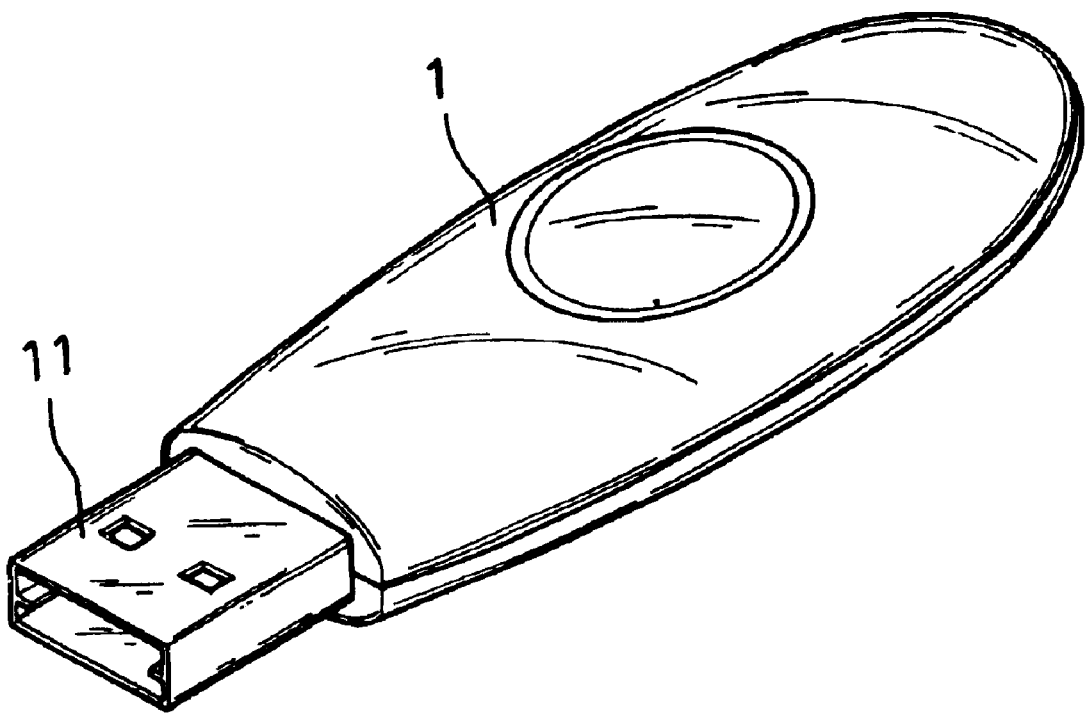
FIG. 1 is a perspective view of a USB flash drive.
Figure 2:
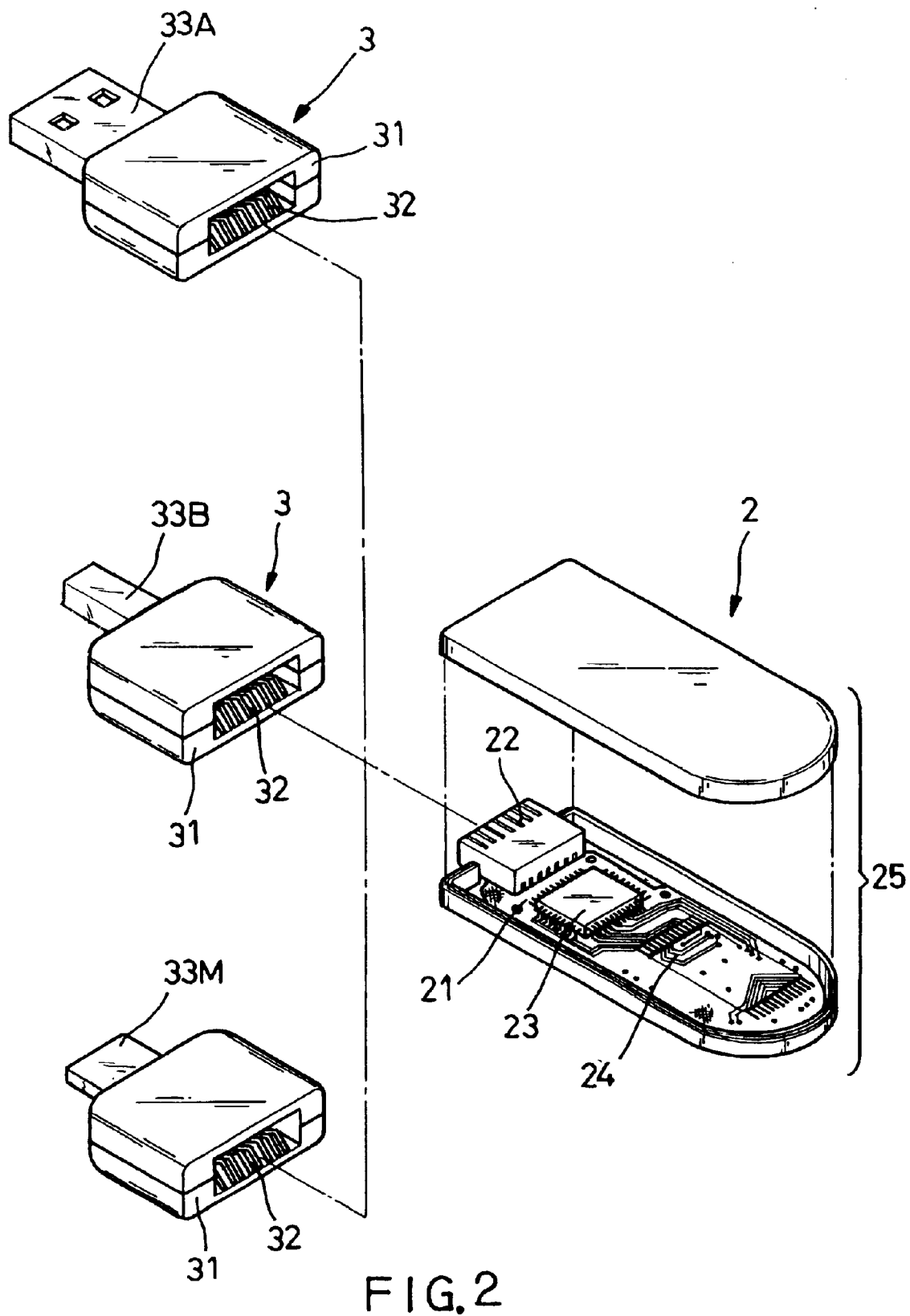
FIG. 2 is a perspective exploded view of an embodiment of the present invention.
Figure 3:
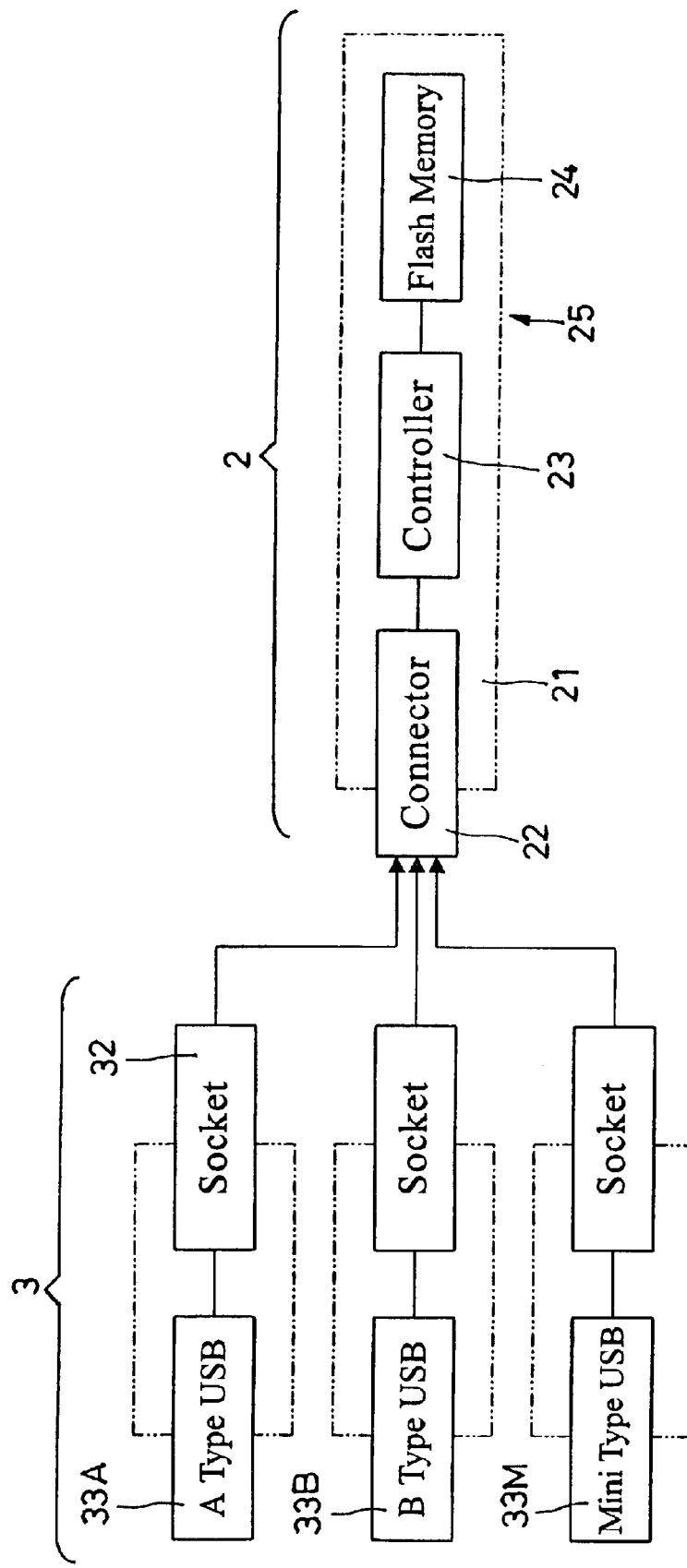
FIG. 3 is a block diagram of the embodiment of the present invention.

First of all, referring to FIGS. 2 and 3, the USB flash drive in accordance with the present invention includes a mobile storage device 2 and at least one interconnector 3. The built-in circuit board 23 of the mobile storage device 2 has a connector 22 at one end thereof which is in connection with a controller 23 and a flash memory 24 to create an electrical connection. Moreover, the connection interface of the connector 22 juts outside the housing 25. The interconnector 3 includes a socket 32 at one end thereof which corresponds to the connector 22 of the mobile storage device 2. The outer end of the interconnector 3 is constructed as a USB interface 33A fastened into the inside of the housing 31. Besides, the outer end of USB interface 33A juts outside the housing 31.

The connector 22 and the socket 32 correspond to each other for a stable interconnection. The arrangement positions of the connector 22 and the socket 32 can be exchanged to reach the same stable interconnection.

The aforementioned USB interface 33A belongs to A-type USB interface with a flat and wide shape. Alternatively, it can be a B-type USB interface 33B with a rectangular shape. Also, it can be a Mini-type USB interface 33M with a flat and narrow shape.

Based upon the above-mentioned, only one mobile storage device 2 can be in connection to different USB ports of personal computer, digital camera, etc. by means of the interconnector 3. The USB interfaces 33A, 33B, 33M, as shown in FIGS. 4 through 6, can be connected with the commercially available products. The most expensive parts of the USB flash drive are semiconductor elements, such as the controller 23 and the flash memory 24 on the circuit board 21. However, the parts of the connector 22 and the socket 32 and the USB interfaces 33A, 33B, 33M are very cheap, and their prices are less than 1% of the price of the mobile storage device 2. As a result, one mobile storage device 2 in combination with three interconnectors 3 won't increase the total cost much. However, the user can connect the mobile storage device 2 with different data equipment (e.g. computer, printer, digital camera, etc.) by changing the interconnector 3 which are provided with USB interface of different specifications. Accordingly, economic efficiency created by one object with multifunctional effects is achieved.

Furthermore, the conventional USB flash drive can be used in combination with only one product. For example, the mini USB port of the digital camera can't be in connection with A-type USB interface of personal computer. Therefore, the image data of the digital camera can't be transmitted through the conventional USB flash drive to the personal computer for further processing or sending an e-mail. However, the present invention is able to resolve this problem. It's only required for the present invention to utilize the interconnector 3 with Mini USB port 33M to transfer the image data within the digital camera to the USB flash drive. Thereafter, use another interconnector 3 with A-type USB port 33A to be in connection to the A-type USB interface of personal computer. Thus, the image data within the USB flash drive can be transmitted to the personal computer immediately. It's very convenient. Similarly, the above-mentioned is also applicable to different digital products of videocameras, printers, etc.

Figure 7:
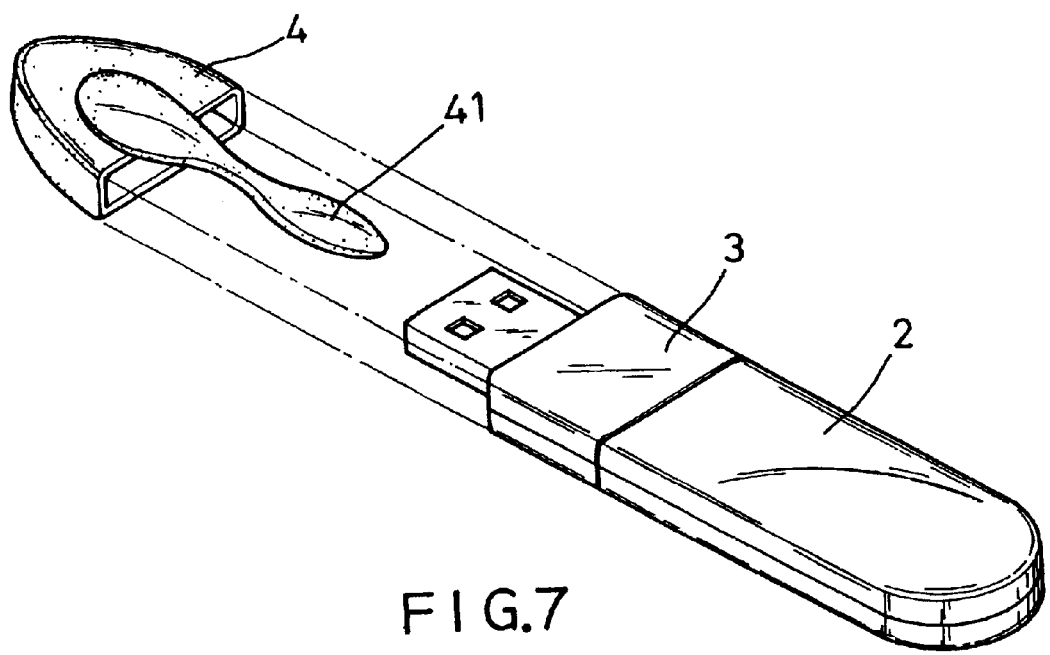
FIG. 7 is a perspective exploded view of the embodiment of the present invention with a clip.
Figure 8:
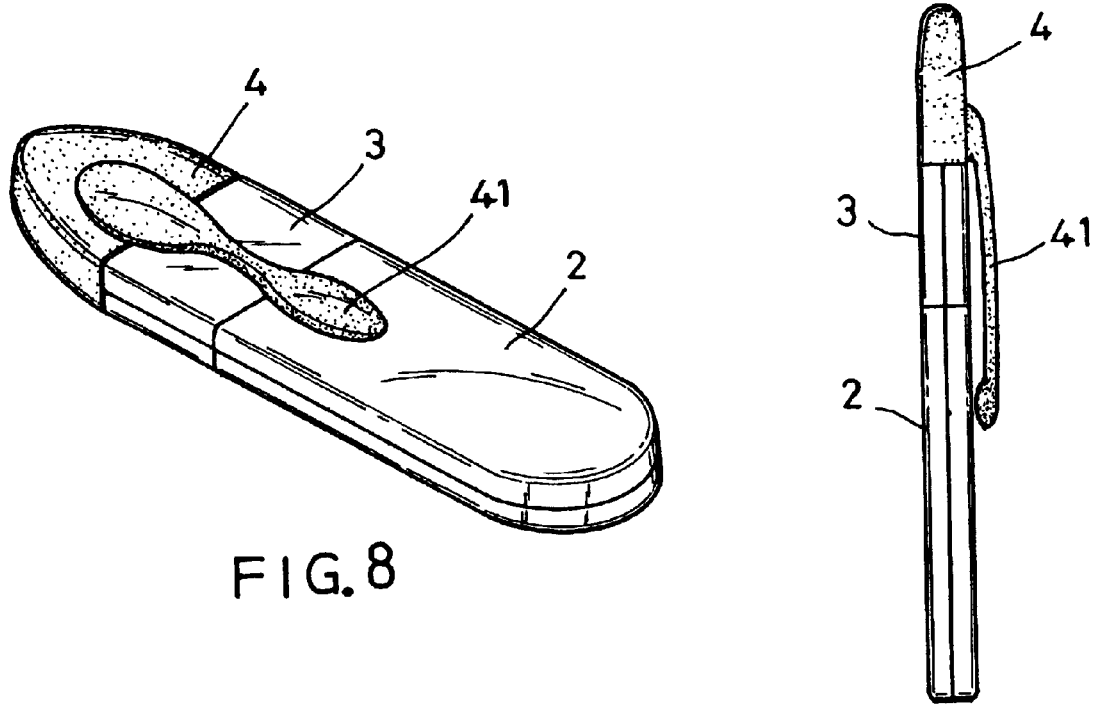
FIG. 8 is a perspective assembly view of the embodiment of the present invention with the clip.
Figure 9:
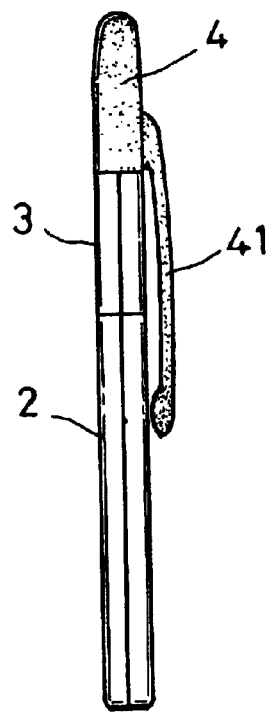
FIG. 9 is a side view of the embodiment of the present invention with the clip.

FIGS. 7 through 9 show assembly views of the USB flash drive in accordance with the present invention. The mobile storage device 2 and the interconnector 3 are put together, thereby forming a USB flash drive in application state. Moreover, the outside of the interconnector 3 can be covered with a cap 4 provided with a clip 41 at the side thereof. Therefore, the USB flash drive is also called as pen drive easy to carry everywhere.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A USB flash drive comprising:

a mobile storage device provided with a built-in circuit board which has a connector at one end thereof disposed in a housing, said connector being electrically connected with a controller and a flash memory mounted on said circuit board, a connection interface of said connector jutting outside said housing; and a set of three interconnectors, each of said three interconnectors having a socket at one end of a housing thereof which matingly corresponds to said connector of said mobile storage device, an opposing end of each said interconnector housing having a USB interface fastened into an inside of said interconnector housing and extending externally therefrom, said USB interface of said three interconnectors respectively being a A-type USB interface with a flat and wide shape, a B-type USB interface with rectangular shape, and a Mini-type USB interface with a flat and narrow shape.

* * * * *